April 6, 1948. C. D. COXE 2,438,901
ORIENTED POLYMERIC SHEATH
Filed July 19, 1944
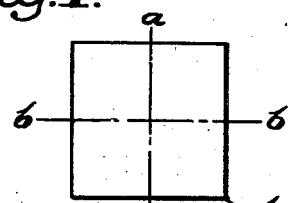
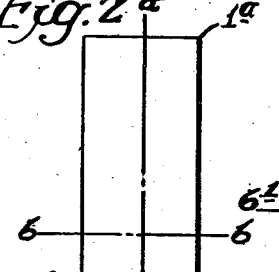
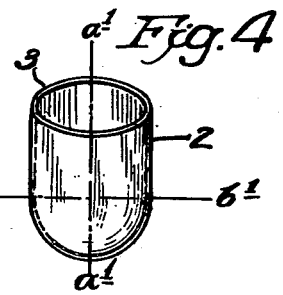
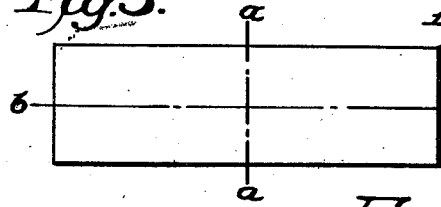
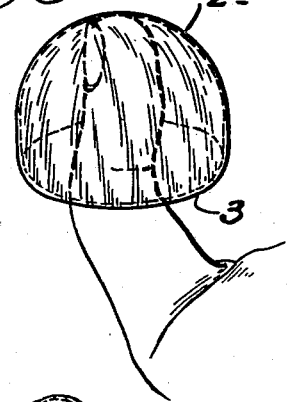
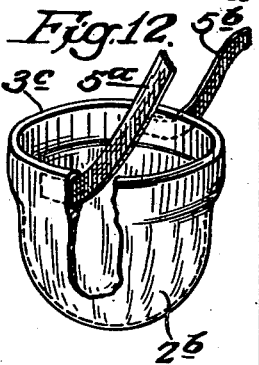
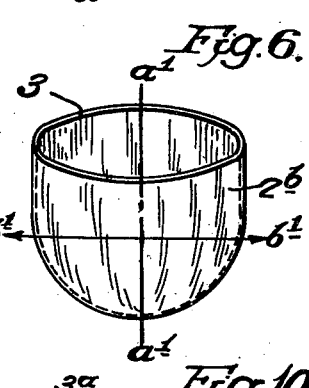
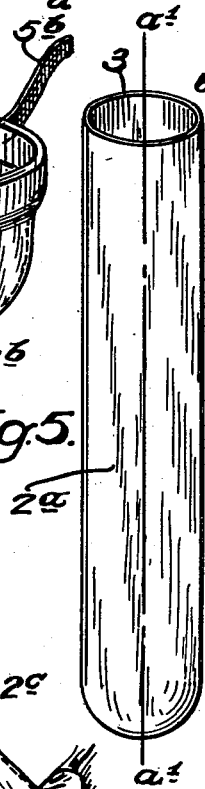
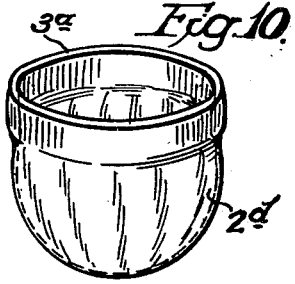
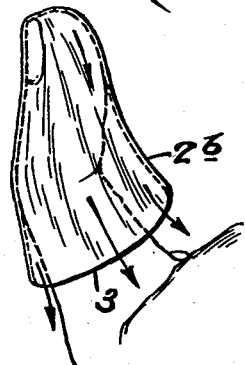
Inventor:—
Charles D. Coxe
by his Attorneys
Howson & Howson Patented Apr. 6, 1948

2,438,901

UNITED STATES PATENT OFFICE 2,438,901

ORIENTED POLYMERIC SHEATH

Charles D. Coxe, Bridgeport, Conn.

Application July 19, 1944, Serial No. 545,679

5 Claims. (Cl. 2—21)

This invention relates to flexible cots or other digit encasements, and to surgical gloves, bathing caps, prophylactic articles and other protective sheaths. One object of the present invention is to provide articles of the variety noted which will be thinner, and therefore more sensitive, than corresponding conventional articles ordinarily composed of thin rubber latex.

Another object of the present invention is to make protective sheathing articles stronger, in addition to their being thinner, than the corresponding conventional rubber appliances.

A further object of this invention is to produce an article having inherent characteristics which will permit the user to adjust the sheath to conform to the shape of and to fit, with any desired degree of tightness, any part of the anatomy to which the sheath can and may be applied.

It is also an object of this invention to provide a thin, flexible, deformable article which will be less subject to deterioration than a corresponding rubber article, as a result of age, or contact with mineral oils, heat, or air.

Generally speaking, the foregoing objects are attained by employing for, or as a part of, the walls of articles manufactured and used in accordance with the principles of the present invention, films or laminae consisting of an organic polymeric material capable of being oriented, by plastic deformation, first in one direction and then in a direction normal thereto, or simultaneously in both directions.

In materials falling within the above category, the molecules appear, by X-ray defraction, to lie normally in a three-dimensional haphazard or random relation to each other, before the material is extended or deformed in any way. However, when extended plastically in one direction, the materials show, by X-ray defraction, a characteristic orientation pattern which is interpreted to indicate that the molecules become aligned in a direction parallel to the axis of deformation. Upon subsequent deformation in a direction at right angles, for example, to the axis of initial deformation, the pattern of orientation changes to one wherein the molecules assume a parallel relation to this second axis of deformation; and when the material is deformed a third time, along an axis substantially corresponding to the initial axis of deformation, a transitory rearrangement of the molecules from parallelism with the second axis of deformation toward parallelism with the third axis of deformation takes place and becomes complete when maximum deformation along the third axis is finally attained. Accordingly, each time the direction of deformation is changed the molecules tend to align with the current axis of deformation and a condition approaching substantially complete orientation is obtained when maximum deformation in that direction is reached.

In instances where the material is initially in a sheet or sheet like form, such as would be found in a cylindrical wall of a tube or the like, the initial three-dimensional random relation of the molecules prevailing before the material is deformed changes to a planar or two-dimensional random state as the thickness of the sheet or wall decreases during, and as a result of, initial deformation in a plurality of directions simultaneously, or as a result of deformation to some extent in one direction initially and to a lesser extent in a direction normal to the first direction subsequently, after which further deformation in any one direction alone will produce uni-directional orientation parallel to the axis of such later deformation. Further description of molecular orientation in organic polymeric materials will be found in United States Letters Patent No. 2,307,817, dated January 12, 1943.

In the finished article, according to the present invention, the polymeric material will be so oriented in relation to the shape and size of the article as to fulfill the above objects, as will appear more fully hereinafter.

Preferably one of the synthetic organic polymeric materials having the properties described is employed, and a material which is particularly suited for the purpose of the present invention belongs to that class of polyamides generally known as nylon, for example, polyhexamethyleneadipamide. Interpolyamides, e. g., those prepared from more than one diamine and dibasic acid, or their respective polyamide forming derivatives, are also included in this class, a particularly adaptable example being a mixture of polyhexamethyleneadipamide, polyhexamethylenesebacamide and caprolactam. These materials are more fully described in U. S. Patents No. 2,071,353; No. 2,130,948; No. 2,190,770; No. 2,188,332; and No. 2,252,554.

Synthetic polyamides (nylons) are particularly well suited for use in the present invention. It is to be understood that the invention is not limited to the use of polyamides, and that any other polymeric materials having the desired properties may be employed. Other examples of synthetic polymeric materials capable of use within the scope of the present invention include vinyl chloride-vinylidene chloride interpolymers with plasticizers, plasticized polyvinyl alcohol, polyvinyl alcohol-acetate interpolymers, plasticized copolymers of vinyl chloride and vinyl acetate, and polyethylenes and its interpolymers. Rubber hydrochloride, such as the product known as "Pliofilm," which is capable of being oriented by plastic deformation in a manner herein described is also applicable for use in the invention.

In the accompanying drawing:

Fig. 1 is a plan view of a flat sheet of material of a kind capable of plastic deformation and molecular orientation in accordance with the principles of the present invention, with the sheet in a primary cast, non-oriented state;

Fig. 2 is a plan view of the piece of material shown in Fig. 1, after the sheet has been initially elongated and oriented in one direction;

Fig. 3 is a plan view of the sheet of material of Figs. 1 and 2 after reorientation in a direction at right angles to the direction of initial orientation shown in Fig. 2;

Fig. 4 is a perspective view of a digit encasement or cot in a primary cast non-oriented state;

Fig. 5 is a perspective view of the cot shown in Fig. 4 after initial elongation and orientation in the direction of its longitudinal axis;

Fig. 6 is a perspective view of the cot shown in Figs. 4 and 5 after diametric or circumferential extension and reorientation;

Fig. 7 shows the reoriented cot of Fig. 6 loosely disposed on the tip of a finger;

Fig. 8 shows the cot of Fig. 7 in the course of being fitted to the finger;

Fig. 9 shows the completely oriented cot fitted snugly in place on the finger;

Figs. 10, 11 and 12 shows modified forms of the invention, illustrating various forms of rim structures for the cot.

Referring more particularly to Fig. 1, there is shown therein a flat thin primary cast sheet $I$ of non-oriented polyhexamethyleneadipamide. In its primary non-oriented state the sheet $I$ would have a tensile strength, for example, of approximately 6000 lbs. per square inch, in either direction, i. e., in the direction of its longitudinal axis $a$—$a$, and in the direction of its lateral or transverse axis $b$—$b$. If the material of the sheet $I$ is extended, say from 300% to 400% along tis axis $a$—$a$, either by cold rolling or by direct tension, to the extent shown at $Ia$ in Fig. 2, the thickness and width of the sheet will be reduced accordingly, and the tensile strength along the axis $a$—$a$ will increase, for example, to approximately 20,000 lbs. per square inch, based on the reduced thickness, while the transverse tensile strength, along the axis $b$—$b$ will remain at the basic 6000 lbs. per square inch based on the reduced thickness. This phenomenon of orientation is more fully discussed in U. S. Patent No. 2,244,208.

It has been found that the initially oriented sheet $Ia$ of Fig. 2 can be readily extended laterally, i. e., in the direction of the axis $b$—$b$, by direct tension or otherwise, into the shape shown at $Ib$ in Fig. 3. As a result of this second orientation, the relation of the tensile strengths of the sheet $Ib$, of Fig. 3, along its longitudinal and transverse axes $a$—$a$ and $b$—$b$ will be reversed, i. e., the tensile strength along axis $a$—$a$ of the sheet $Ib$ shown in Fig. 3, will have decreased to approximately 6000 lbs. per square inch, while the tensile strength along axis $b$—$b$ of the sheet $Ib$ will have increased to approximately 20,000 lbs. per square inch.

In the stage shown in Fig. 3, as a result of the sequential plastic deformation in perpendicular directions respectively, the initial non-oriented sheet of Fig. 1 in undergoing the plastic deformation to produce the sheet $Ia$ of Fig. 2 and the sheet $Ib$ of Fig. 3, will have undergone a substantial reduction in thickness. Reorientation of the sheet may be effected any number of times by the application of tension in the direction of its currently weaker axis. Substantially all thickness reduction occurs during and as a result of the first complete orientation, or, in any event, very little thickness reduction will occur after the first reorientation.

Any synthetic organic polymeric material capable of performing in the manner just described, whether in the same or different order of magnitude of extension or strength, may be used, provided the strength, formability, and other properties are generally suited for the purpose intended.

In accordance with the principles of the present invention, in the manufacture of hollow encasement articles, a suitable material is first cast or otherwise formed into primary shape such as a tube, cup, cylinder, etc. having one end closed as shown at 2, in Fig. 4. The primary shaping of the article may be accomplished by any conventional and well-known means, such, for example, as by dipping a cooled mold, form, or mandrel having the desired exterior configuration into a molten bath of the polymer, then withdrawing the shaping device and allowing the polymer to freeze or solidify thereon. Or, the shaping device may be dipped into a solution of the polymer, and, after withdrawing, the solvent may be evaporated leaving a continuous film of the polymer on the exterior of the shaping device; or the primary article may be fabricated from a flat sheet or ribbon, by wrapping the strip on a mandrel and cementing it along overlapping or abutting edges of the wound strip. Details of such operations are described in U. S. Patent No. 2,307,817.

Should an article having a wall of gradually tapering thickness from the open end to the closed end be desired, this may be accomplished in different ways, for example, as by using a preheated mandrel for effecting the primary casting and slowly withdrawing it from the solution bath of material, whereby rapid evaporation of the solvent, while the mandrel is hottest, will cause the wall to be thicker adjacent the open end of the casting; then, as the mandrel cools, greater flowing of the material will take place as the mandrel is slowly withdrawn, leaving a wall or film, on the mandrel, of decreasing thickness from the open to the closed end of the article.

The use of a wall of tapering thickness in the initial casting reduces the possibility of rupture adjacent the open end of the sheath where gripped to effect axial elongation of the sheath; produces a progressive thinning of the wall during elongation; and affords a minimum circumferential contraction until maximum axial elongation is substantially attained, after which further longitudinal tension will effect circumferential contraction proportionate to the extent of the longitudinal tension applied.

The primary hollow structure 2, shown in Fig. 4, is first elongated and statically deformed in the direction of its longitudinal axis $aI$—$aI$ by direct tension, i. e., the material is placed under tension and is thereby stretched without reaction tending to return it to its original form when the tension is discontinued, as would occur in the case of an article formed of an inherently resilient or elastic material, such as rubber, or the deformation may be effected by cold rolling. The deformation is continued until the structure attains the state or condition shown at 2a in Fig. 5, wherein orientation of the molecules would be at least predominately, though not necessarily completely, in the direction of the axis al, al of deformation, depending upon the degree of completeness of the elongation in relation to the maximum obtainable. In this initially oriented state, the hollow structure 2a of Fig. 5, when maximum elongation in the direction of the axis al—al is attained, would be about twice as long and about half as large in diameter for example, as the finger it is intended to fit.

The axially elongated structure 2a of Fig. 5 is then distended and statically deformed diametrically, i. e., in the direction bl, bl by the application of direct lateral tension, or radially as, for example, by pneumatic inflation, similar to the disclosure of U. S. Patent No. 2,307,817, or mechanically as by use of a radially expandable mandrel etc., to a size about twice the diameter of the finger which the ultimate product is intended to fit.

As a result of the transverse or circumferential distention in the direction bl, bl, the dimension along axis al—al will be foreshortened to about half the length of the finger that the ultimate structure is intended to encase. The resulting cot in its newly reoriented state is shown at 2b in Fig. 6. In this instance orientation of the molecules would be predominately in the direction of the circumference of the article, depending on what degree of maximum circumferential distention has been attained.

While it is possible to proceed directly from the primary cast stage of Fig. 4 to the pre-application stage of Fig. 6 wherein substantial circumferential orientation has taken place, thereby omitting the longitudinal extension stage of Fig. 5, it has been found that the step shown in Fig. 5 is advantageous in producing uniformly thin walls, and in facilitating the lateral distention to the shape shown at 2b in Fig. 6.

The cot 2b, as shown in Fig. 6, will fit very loosely over almost any human finger, regardless of its size, within normal dimensional variations therein. The wall thickness will be from one-half to one-quarter the original thickness of the primary cast structure 2 of Fig. 4.

Because of the predominantly circumferential orientation of the material in the pre-application cot 2b, of Fig. 6, it will be readily extensible in the direction of its longitudinal axis al—al.

If the cot 2b of Fig. 6 is slipped loosely over the finger, as shown in Fig. 7, and the structure is then grasped at and/or adjacent its rim or open edge 3, and pulled in the direction of its longitudinal axis al—al, as shown in Fig. 8, the cot 2b will contract diametrically until it embraces the finger in a snug conforming fit, as the ultimate cot 2c shown in Fig. 9.

The salient feature of the invention therefore, resides in the provision of the primary cast article and the single or multi-directional orientation thereof, whereby an oriented sheath of a given size can be made to fit any normal size finger, with any degree of intensity of embrace which the user may desire, and whereby the tautness of the fit may be regulated by the magnitude of the longitudinal tension under which the cot is placed in the final stage of its application to a finger.

A further advantage gained by the present invention, particularly when a polymer is used, such as polyhexamethyleneadipamide or related interpolymers, is that increased bursting strengths are obtained up to fifty times the bursting strength of corresponding articles composed of standard carbon filled vulcanized rubber. Consequently, significant reduction in the thickness of the wall may be made in the article of the present invention with safety.

Furthermore, articles produced under the present invention are clear and transparent, resistant to moisture and to many common solvents, and do not deteriorate by contact with mineral oils or greases.

By the present invention it is possible to produce a tenuous sheath so thin that it is impractical to roll it about the rim in the conventional manner for application. However, the adaptability of the oversized oriented pre-application sheath to post-application reduction, after it has been easily slipped over the member to be encased, constitutes a simple and practical method for applying to the fingers, etc., a close-fitting sheath, which normally would be too thin to handle conveniently by the usual methods.

It is obvious that the construction previously described can be advantageously adapted for use in bathing caps, surgical gloves, prophylactic or other sheaths for encasing portions or members of the human body where it is possible to apply the sheath initially as a loose fitting article and subsequently tighten the article to fit the encased member snugly by effecting contraction in one direction through the application of tension to the article in another direction.

In a bathing cap, the orientation when the cap is ready for use would be substantially circumferential. The cap should initially fit over the head loosely, then when the rim is grasped and pulled downwardly over the ears, circumferential contraction will occur and cause the cap to fit snugly about the head.

In a surgical glove, the orientation would be transverse to the longitudinal axis of the hand. The glove should be shorter and of greater lateral proportions than the hand it is to fit. After the glove is placed loosely over the hand, longitudinal tension is applied to the wrist portion, by pulling the open end of the glove toward the elbow, which will cause the glove to elongate axially and contract laterally to form a snug fit.

As shown in Figs. 10, 11 and 12, the rims 3a, 3b and 3c of the articles 2d, 2e and 2f respectively may be reinforced by thickening, as shown in said figures; and, in some instances, tapes 5a and 5b may be provided, with one end of each tape embedded and anchored in the thickened rim, as shown in Fig. 12 and with the opposite ends of the two tapes free for wrapping around the encased member and to be tied, to prevent the article from being accidentally removed from the encased member, especially when the sheath fits the encased member loosely. The reinforced rims will serve as a means for effecting or facilitating the elongation of the article during its initial deformation from its primary cast stage, such as shown in Fig. 4, to its initially deformed stage of Fig. 5.

If tapering walls, i. e., walls thicker at the open end of the article than at and adjacent the closed end thereof, are desired, the primary casting may be made to the shape shown in broken lines at 2d in Fig. 11, and expanded pneumatically, hydraulically or otherwise into the full line shape 2c, Fig. 11, during which the portion of the wall adjacent the closed end will be stretched to a greater extent than the portion of the wall adjacent the open end, hence the portion of the wall adjacent the closed end of the sheath will be thinned to a greater extent than the portion adjacent the open end, with the portion intermediate said ends tapering in thickness therebetween.

I claim:

1. An anatomical sheath or cover formed of polymeric material, at least an effective part of the sheath body having substantial molecular orientation in the circumferential direction, said part by reason of such orientation being substantially larger in circumference than the member to be encased thereby, and being capable of permanent axial extension and concomitant circumferential contraction to transform said part to the diameter and shape of said member and to cause said part to fit said member snugly.

2. An anatomical sheath or cover according to claim 1, wherein said material is oriented molecularly to some degree in the axial direction but to a greater degree in the circumferential direction.

3. An anatomical sheath or cover according to claim 1, having a thickened rim at the open end to facilitate axial extension.

4. An anatomical sheath or cover according to claim 1, having a rim of substantially non-oriented material.

5. An anatomical sheath or cover according to claim 1, formed of nylon.

CHARLES D. COXE.

REFERENCES CITED

The following references are of record in the file of this patent:

UNITED STATES PATENTS

| Number | Name | Date |
|---|---|---|
| 2,348,773 | Wyman | May 16, 1944 |
| 2,358,440 | Bowman | Sept. 19, 1944 |
| 1,988,709 | Barns | Jan. 22, 1935 |
| 2,288,840 | Raiche | July 7, 1942 |